(12) United States Patent
Takahara et al.

(10) Patent No.: US 9,595,887 B2
(45) Date of Patent: Mar. 14, 2017

(54) THREE-PHASE POWER CONVERSION DEVICE

(71) Applicant: Mitsubishi Electric Corporation, Chiyoda-ku (JP)

(72) Inventors: Takaaki Takahara, Chiyoda-ku (JP); Ryota Kondo, Chiyoda-ku (JP); Satoshi Murakami, Chiyoda-ku (JP); Masaki Yamada, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 66 days.

(21) Appl. No.: 14/758,668

(22) PCT Filed: Nov. 25, 2013

(86) PCT No.: PCT/JP2013/081652
§ 371 (c)(1),
(2) Date: Jun. 30, 2015

(87) PCT Pub. No.: WO2014/125697
PCT Pub. Date: Aug. 21, 2014

(65) Prior Publication Data
US 2015/0357937 A1    Dec. 10, 2015

(30) Foreign Application Priority Data
Feb. 15, 2013  (JP) ................................ 2013-027465

(51) Int. Cl.
*H02M 1/084*  (2006.01)
*H02M 7/217*  (2006.01)
(Continued)

(52) U.S. Cl.
CPC ........... *H02M 7/537* (2013.01); *H02M 7/217* (2013.01); *H02M 7/483* (2013.01); *H02M 7/49* (2013.01); *H02M 2007/4835* (2013.01)

(58) Field of Classification Search
CPC ..... H02M 1/084; H02M 7/2173; H02M 7/979
(Continued)

(56) References Cited

U.S. PATENT DOCUMENTS

| 2013/0229835 A1* | 9/2013 | Yamanaka | H02M 5/4585 363/37 |
| 2014/0078796 A1* | 3/2014 | Inoue | H02M 5/10 363/68 |
| 2015/0357937 A1* | 12/2015 | Takahara | H02M 7/217 363/97 |

FOREIGN PATENT DOCUMENTS

| JP | 2008 306805 | 12/2008 |
| WO | 2010 103600 | 9/2010 |

OTHER PUBLICATIONS

International Search Report Issued Feb. 18, 2014 in PCT/JP2013/081652 Filed Nov. 25, 2013.

\* cited by examiner

*Primary Examiner* — Jeffrey Sterrett
(74) *Attorney, Agent, or Firm* — Oblon, McClelland, Maier & Neustadt, L.L.P.

(57) ABSTRACT

A three-phase power conversion device includes: single-phase inverters having AC output ends connected in series to the respective phases of the three-phase AC lines; a control device for performing PWM control for each single-phase inverter based on a voltage command V*; and an AC voltage detection circuit for detecting a phase and a voltage amplitude of three-phase AC voltage. The control device adds a zero-phase component Vo common to the three phases to a basic command Vx* for each phase to generate a voltage command V*. The zero-phase component Vo is generated by applying an amplitude a calculated based on the phase and the voltage amplitude to reference zero-phase voltage Voo (Continued)

that has been set, thereby reducing a peak of the voltage command V* for each single-phase inverter.

9 Claims, 7 Drawing Sheets

(51) Int. Cl.
 *H02M 7/537* (2006.01)
 *H02M 7/483* (2007.01)
 *H02M 7/49* (2007.01)
(58) Field of Classification Search
 USPC .................... 363/34, 37, 65, 71, 89, 97, 131
 See application file for complete search history.

THREE-PHASE POWER CONVERSION DEVICE

TECHNICAL FIELD

The present invention relates to a three-phase power conversion device for converting power between three-phase AC power and DC power.

BACKGROUND ART

One of conventional three-phase power conversion devices converts DC power of a distributed power supply such as a solar battery to three-phase-output AC power and outputs the AC power to a load. This conventional three-phase power conversion device includes a three-phase 3-level inverter connected between positive and negative terminals of a first DC power supply, and one or a plurality of single-phase inverters which receive smaller DC voltage than voltage of one level of the three-phase 3-level inverter and are connected in series to an AC output line for each phase of the three-phase 3-level inverter. Each phase of the three-phase 3-level inverter outputs one pulse of voltage per half cycle of voltage for each phase outputted to the load. Each single-phase inverter performs output by PWM control, and a sum of output voltage of the three-phase 3-level inverter and output voltage of each single-phase inverter is outputted via a smoothing filter to the load. Each single-phase inverter performs output based on an output voltage command obtained by superimposing zero-phase voltage common to the three phases, onto difference voltage for each phase obtained by subtracting output voltage for each phase of the three-phase 3-level inverter from sine wave voltage for each phase. The zero-phase voltage common to the three phases is calculated by inverting the polarity of average voltage obtained by averaging the maximum value and the minimum value among the difference voltages for these phases at each point of time (for example, see Patent Document 1).

CITATION LIST

Patent Document

Patent Document 1: International Publication No. WO2010/103600

SUMMARY OF THE INVENTION

Problems to be Solved by the Invention

The conventional three-phase power conversion device as described above superimposes zero-phase voltage common to three phases onto output voltage of each single-phase inverter, thereby realizing reduction in DC voltage of each single-phase inverter. However, the zero-phase voltage to be superimposed is uniquely determined based on difference voltage between sine wave voltage and output voltage of the three-phase 3-level inverter. Therefore, there is a problem that there is no freedom in control designing, and setting for DC voltage of each single-phase inverter is limited.

The present invention has been made to solve the above problem, and an object of the present invention is to allow for change in a voltage level of a zero-phase voltage component to be superimposed onto output voltage of each single-phase inverter, and for easy generation of the zero-phase voltage component, thereby improving the degree of freedom in designing and realizing reduction in DC voltage of each single-phase inverter.

Solution to the Problems

A three-phase power conversion device according to the present invention includes: single-phase inverters each including a DC capacitor and a plurality of semiconductor switching elements, the single-phase inverters having AC output ends connected in series to respective phases of three-phase AC lines; and a control device for performing PWM control for each single-phase inverter based on a voltage command. The three-phase power conversion device further includes an AC voltage detection circuit for detecting a phase and voltage of three-phase AC voltage from the three-phase AC lines. The control device includes a voltage command generating section for, based on the phase and the voltage from the AC voltage detection circuit, adding a zero-phase component common to the three phases to a basic command for each phase to generate the voltage command. The voltage command generating section calculates an amplitude of the zero-phase component and applies the amplitude to reference zero-phase voltage set in advance, to determine the zero-phase component synchronized with the phase of the three-phase AC voltage.

Effect of the Invention

Since the three-phase power conversion device according to the present invention is configured as described above, a voltage level of a zero-phase voltage component to be added to output voltage of each single-phase inverter can be changed and the zero-phase voltage component can be easily generated. Therefore, while line-to-line voltages of three-phase AC output are kept in a three-phase equilibrium state, the degree of freedom in designing is improved and DC voltage of the single-phase inverter can be reduced. Thus, reduction in withstand voltage of each element of the single-phase inverter can be effectively promoted, and a three-phase power conversion device with a small size and high efficiency can be reliably obtained.

DESCRIPTION OF EMBODIMENTS

Embodiment 1

Hereinafter, as a three-phase power conversion device according to embodiment 1 of the present invention, a three-phase power conversion device that converts three-phase AC power from an AC power supply to DC power will be described based on the drawings.

Figure 1:
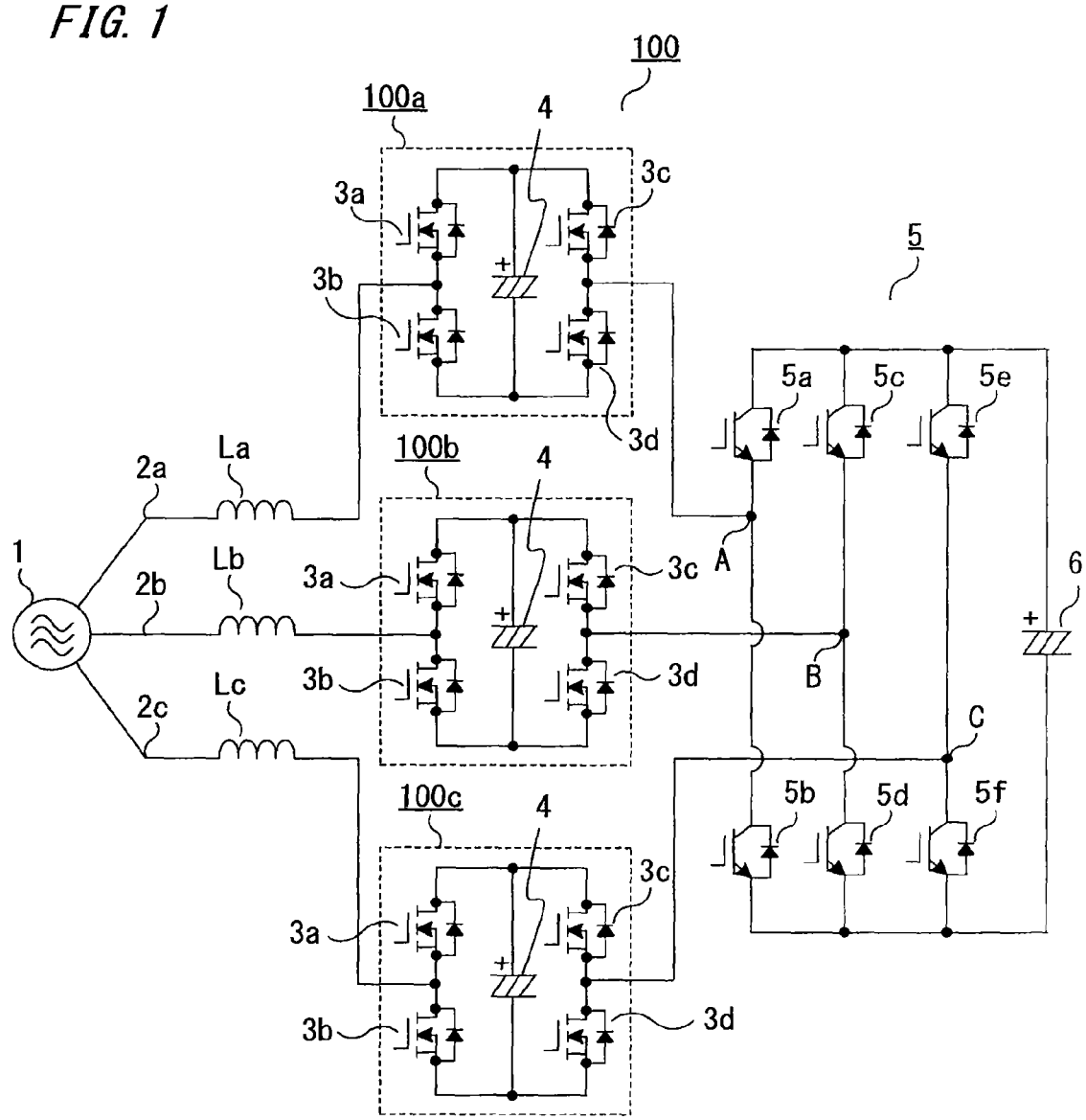
FIG. 1 is a diagram showing a main circuit configuration of a three-phase power conversion device according to embodiment 1 of the present invention.

FIG. 1 is a schematic configuration diagram of a main circuit of the three-phase power conversion device according to embodiment 1 of the present invention. As shown in FIG. 1, the three-phase power conversion device includes: an inverter circuit 100 connected to three-phase AC lines from an AC power supply 1 which is a three-phase AC voltage source; a three-phase converter 5 as a three-phase power converter; and a smoothing capacitor 6 as a capacitor connected to a DC side of the three-phase converter 5. The three-phase AC lines are composed of AC input lines 2a to 2c for respective phases (hereinafter, simply referred to as AC lines 2a to 2c for respective phases) from the AC power supply 1, and the inverter circuit 100 is composed of single-phase inverters 100a to 100c for respective phases. The AC lines 2a to 2c for respective phases are connected to reactors La to Lc for respective phases as a current-limiting circuit, and then the reactors La to Lc for respective phases are connected in series to AC sides of the single-phase inverters 100a to 100c.

Each of the single-phase inverters 100a to 100c is composed of semiconductor switching elements 3a to 3d and a DC capacitor 4. As the semiconductor switching elements 3a to 3d, an insulated gate bipolar transistor (IGBT) to which a diode is connected in antiparallel, or a metal oxide semiconductor field effect transistor (MOSFET) having a diode provided between the source and drain thereof, is used, for example. The reactors La to Lc for respective phases may be connected after the single-phase inverters 100a to 100c.

A three-phase converter 5 is composed of semiconductor switching elements (5a, 5b), (5c, 5d), and (5e, 5f) such that two semiconductor elements are connected in series for each phase. AC ends A, B, and C for respective phases of the three-phase converter 5 are connected to the respective single-phase inverters 100a to 100c via the AC lines 2a to 2c for respective phases. A positive terminal and a negative terminal of a smoothing capacitor 6 are connected to a DC side of the three-phase converter 5. In this case, as the semiconductor switching elements 5a to 5f, an IGBT to which a diode is connected in antiparallel, or a MOSFET having a diode provided between the source and drain thereof, is used, for example.

Figure 2:
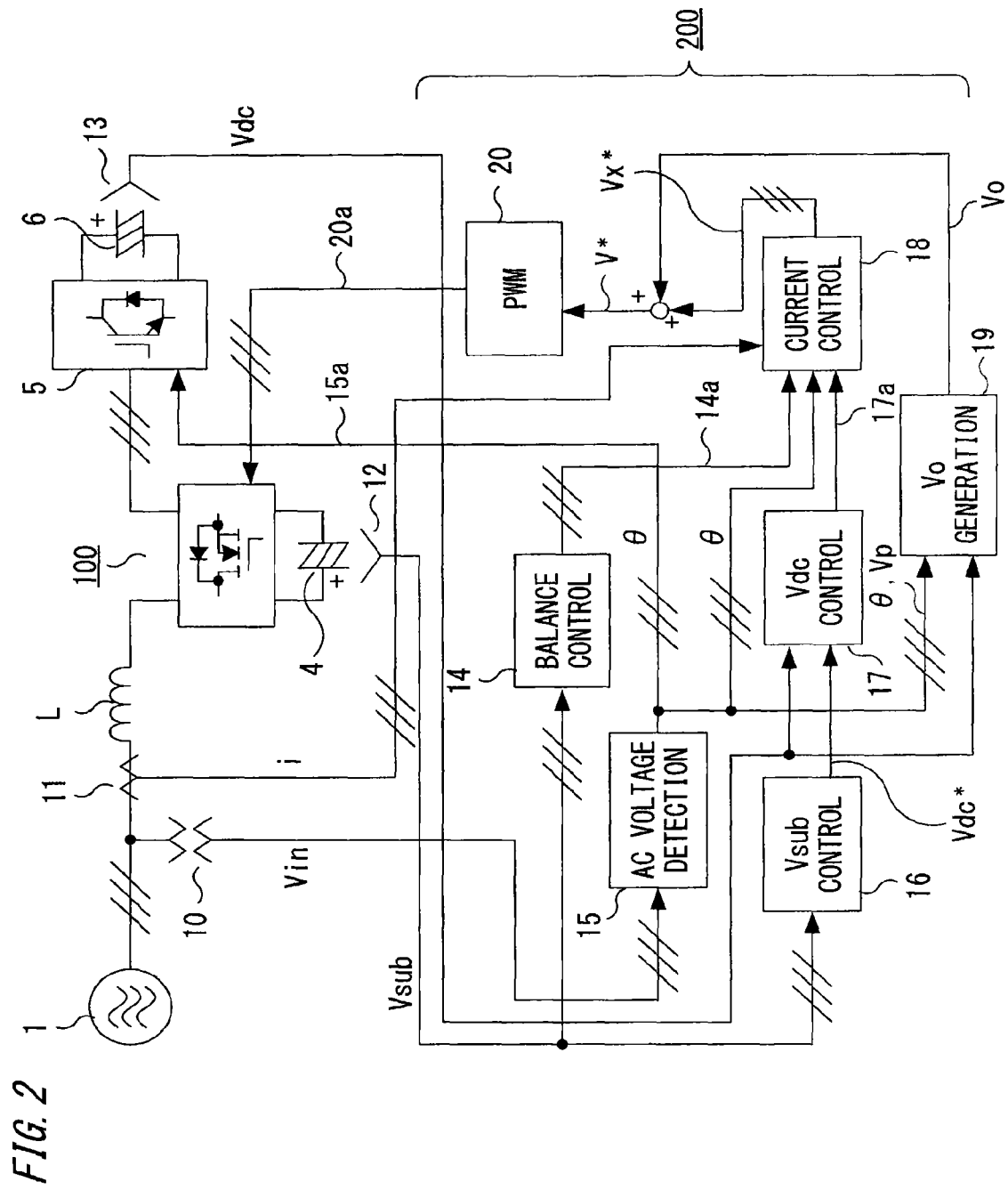
FIG. 2 is a diagram for explaining a control configuration of the three-phase power conversion device according to embodiment 1 of the present invention.

FIG. 2 shows a control configuration of the three-phase power conversion device having the main circuit configured as described above. As shown in FIG. 2, the three-phase power conversion device includes: a voltage sensor 10 for detecting voltage Vin of the AC power supply 1; a current sensor 11 for detecting AC input current (hereinafter, referred to as AC current i) flowing in a reactor L (La to Lc); a voltage sensor 12 for detecting voltage Vsub of the DC capacitor 4 of each of the single-phase inverters 100a to 100c; and a voltage sensor 13 for detecting voltage Vdc of the smoothing capacitor 6. A control device 200 generates a drive signal 20a for each of the semiconductor switching elements 3a to 3d in the single-phase inverters 100a to 100c, and a drive signal 15a for each of the semiconductor switching elements 5a to 5f in the three-phase converter 5, based on results of detections by the voltage sensors 10, 12, and 13 and the current sensor 11, thereby performing output control for the single-phase inverters 100a to 100c and the three-phase converter 5.

As shown in FIG. 2, the control device 200 includes: a balance control section 14 for performing balance control so that the DC capacitor voltages Vsub of the inverter circuit 100 are balanced; an AC voltage detection circuit 15 for detecting information about a phase and voltage of the AC power supply voltage Vin; a Vsub control section 16 for controlling each DC capacitor voltages Vsub; a Vdc control section 17 for controlling the smoothing capacitor voltage Vdc; a current control section 18 for controlling the AC current i; a zero-phase component generating section (hereinafter, Vo generating section) 19 for generating a zero-phase component Vo described later for generation of a voltage command for the inverter circuit 100; and a PWM circuit 20 for generating a drive signal for the inverter circuit 100. The current control section 18 and the Vo generating section 19 form a voltage command generating section.

The AC power supply voltage Vin detected by the voltage sensor 10 is inputted to the AC voltage detection circuit 15, and the AC voltage detection circuit 15 detects an AC phase θ and an AC voltage amplitude Vp for each phase, which are information about a phase and voltage of the AC power supply voltage Vin. A signal of the detected AC phase θ is outputted as the drive signal 15a to the three-phase converter 5, to drive each of the semiconductor switching elements 5a to 5f of the three-phase converter 5 for every half positive/negative wave of the AC power supply voltage Vin for each phase.

The Vsub control section 16 receives the DC capacitor voltage Vsub of each of the single-phase inverters 100a to 100c, which is detected by the voltage sensor 12, and generates and outputs a command value Vdc* for the smoothing capacitor voltage Vdc so that the DC capacitor voltage Vsub becomes equal to a set command value Vsub*.

The Vdc control section 17 receives the smoothing capacitor voltage Vdc detected by the voltage sensor 13 and the command value Vdc* from the Vsub control section 16, and generates and outputs an amplitude command value 17a for the AC current i so that the smoothing capacitor voltage Vdc becomes equal to the command value Vdc*.

Each DC capacitor voltage Vsub from the voltage sensor 12 is inputted also to the balance control section 14, and the balance control section 14 generates and outputs an amplitude correction value 14a for each phase for the AC current i so that the DC capacitor voltages Vsub are balanced.

The current control section 18 receives the AC current i detected by the current sensor 11, the AC phase θ from the AC voltage detection circuit 15, and the amplitude command value 17a and the amplitude correction value 14a for the AC current i. The current control section 18 generates a sine-wave current command i* based on the AC phase θ and an amplitude Ip obtained by correcting the amplitude command value 17a with the amplitude correction value 14a, and generates and outputs a basic command Vx* for output voltage of each of the single-phase inverters 100a to 100c so that the AC current i follows the generated current command i*.

The Vo generating section 19 receives the AC phase θ and the AC voltage amplitude Vp from the AC voltage detection circuit 15, and the smoothing capacitor voltage Vdc, and generates and outputs the zero-phase component Vo. The outputted zero-phase component Vo is added to the basic command Vx* for each phase from the current control section 18, whereby a voltage command V* for each of the single-phase inverters 100a to 100c is generated.

The PWM circuit 20 generates the drive signal 20a for performing PWM control for each of the single-phase inverters 100a to 100c based on the inputted voltage command V*, thereby driving each of the semiconductor switching elements 3a to 3d in the single-phase inverters 100a to 100c.

Hereinafter, operation of the three-phase power conversion device controlled as described above will be described with reference to one of the three phases, for example, A-phase. Also for the other two phases (B-phase and C-phase), the same operation is performed though there is a phase difference by 2π/3 from each other among the three phases.

Figure 3:
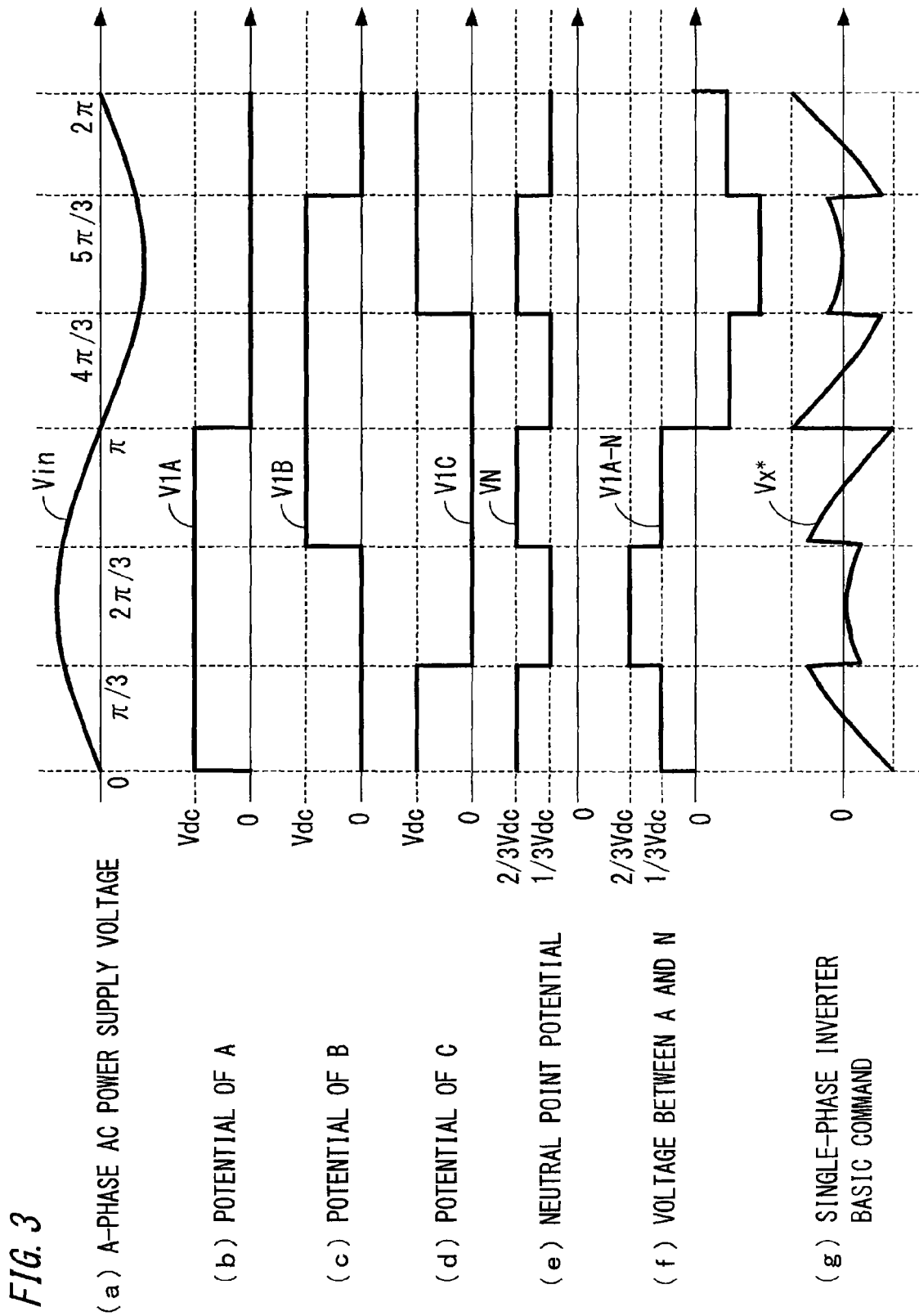
FIG. 3 is a diagram of waveforms at various parts, for explaining operation of the three-phase power conversion device according to embodiment 1 of the present invention.
Figure 8:
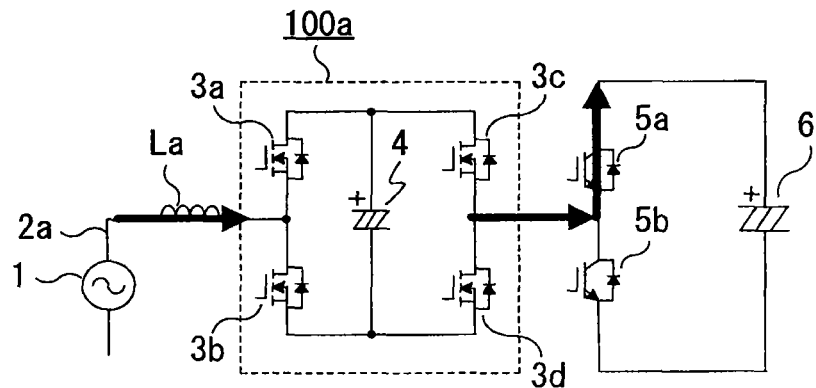
FIG. 8 is a diagram for explaining operation of a three-phase converter according to embodiment 1 of the present invention.
Figure 9:
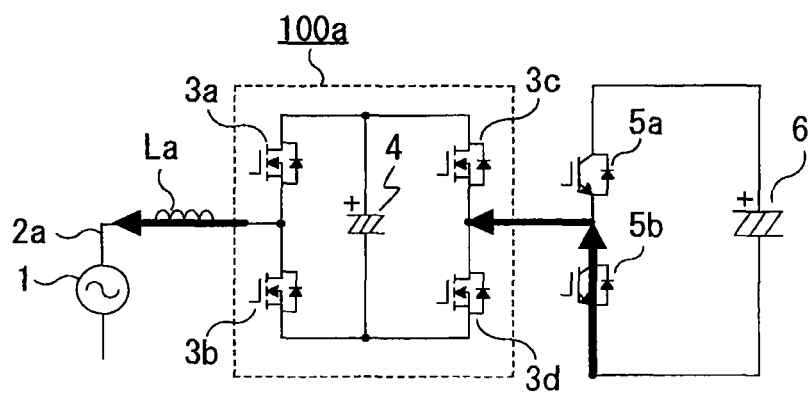
FIG. 9 is a diagram for explaining operation of the three-phase converter according to embodiment 1 of the present invention.
Figure 10:
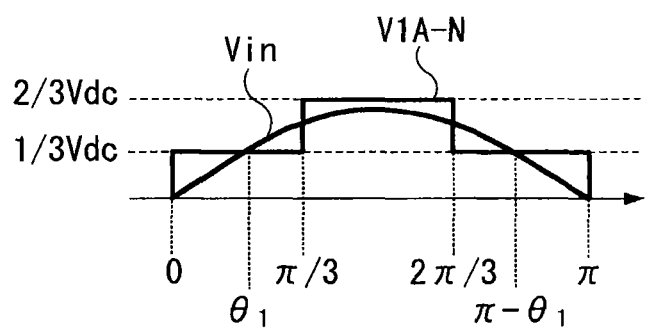
FIG. 10 is a waveform diagram for explaining a voltage command for the single-phase inverter according to embodiment 1 of the present invention.
Figure 11:
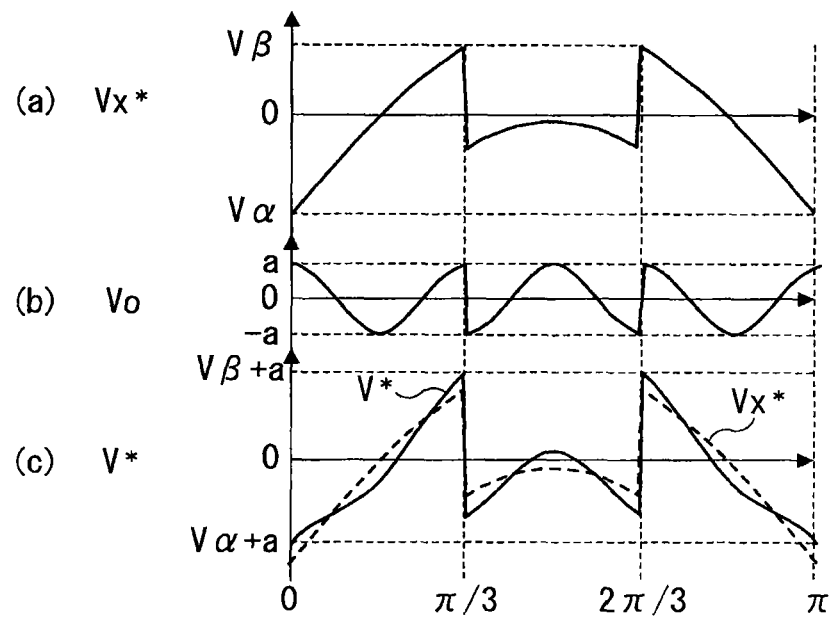
FIG. 11 is a waveform diagram for explaining generation of the voltage command for the single-phase inverter according to embodiment 1 of the present invention.
Figure 12:
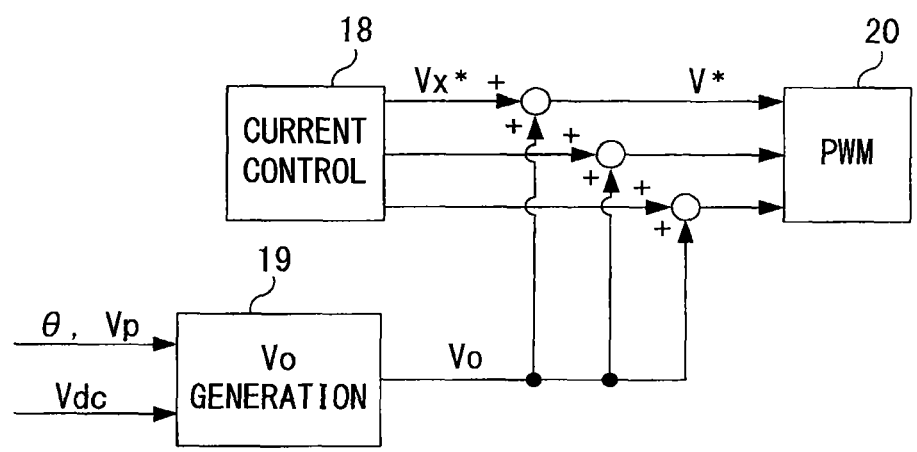
FIG. 12 is a control block diagram for explaining generation of the voltage command for the single-phase inverter according to embodiment 1 of the present invention.

FIG. 3 is a diagram of waveforms at various parts, for explaining operation of the three-phase power conversion device. FIG. 4 to FIG. 7 are diagrams for explaining operation of the single-phase inverter 100a. FIG. 8 and FIG. 9 are diagrams for explaining operation for one phase (A-phase) of the three-phase converter 5. FIG. 10 is a waveform diagram for explaining the voltage command for the single-phase inverter 100a. FIG. 11 and FIG. 12 are a waveform diagram and a control block diagram for explaining generation of the voltage command for the single-phase inverter 100a.

FIG. 3(a) is a voltage waveform of the AC power supply voltage (phase voltage for A-phase) Vin inputted from the AC power supply 1. When the polarity of the AC power supply voltage Vin for A-phase is positive, the semiconductor switching element 5a of the three-phase converter 5 is controlled to be ON and the semiconductor switching element 5b of the three-phase converter 5 is controlled to be OFF. When the polarity of the AC power supply voltage Vin is negative, the semiconductor switching element 5b is controlled to be ON and the semiconductor switching element 5a is controlled to be OFF. Thus, as shown in FIG. 3(b), a potential V1A of the AC end A for A-phase of the three-phase converter 5 has such a voltage waveform that the voltage Vdc of the smoothing capacitor 6 is outputted in a half cycle. In this case, the smoothing capacitor voltage Vdc is assumed to be higher than the AC power supply voltage Vin.

Regarding the other two phases (B-phase and C-phase), similarly, potentials V1B and V1C of the AC end B and the AC end C of the three-phase converter 5 have voltage waveforms shown in FIG. 3(c) and FIG. 3(d). As a result, a potential (hereinafter, referred to as a neutral point potential VN) of a neutral point N has an average value among the AC end potentials V1A, V1B, and V1C for the three phases, thus having a waveform shown in FIG. 3(e). Voltage V1A-N of the AC end A using the neutral point potential VN as a reference has a voltage waveform shown in FIG. 3(f).

A voltage waveform shown in FIG. 3(g) is difference voltage obtained by subtracting the voltage V1A-N of the AC end A from the AC power supply voltage Vin, and is the basic command Vx* for output voltage of the single-phase inverter 100a. Although the details of control and operation of the single-phase inverter 100a will be described later, the single-phase inverter 100a performs output while controlling the current i for A-phase by PWM control so that an input power factor for A-phase from the AC power supply 1 becomes approximately one, and superimposes the AC-side output voltage onto the voltage V1A-N of the AC end A. It is noted that voltage of the single-phase inverter 100a is voltage of the AC output end on the AC power supply 1 side using a potential of the AC output end on the three-phase converter 5 side as a reference.

Next, operation of the single-phase inverter 100a will be described.

Figure 4:
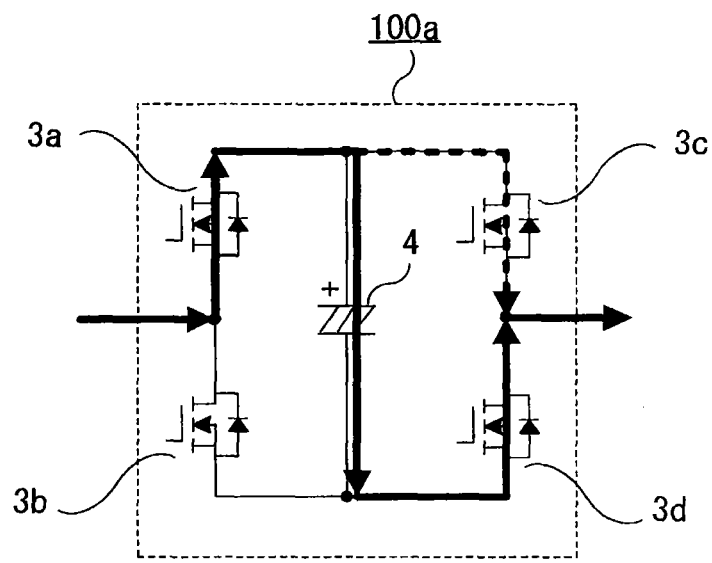
FIG. 4 is a diagram for explaining operation of a single-phase inverter according to embodiment 1 of the present invention.

When polarities of voltage and current for A-phase of the AC power supply 1 are positive, if the semiconductor switching element 3a is ON and the semiconductor switching element 3b is OFF, current flows in the single-phase inverter 100a through a current route shown in FIG. 4. If the semiconductor switching element 3c is ON and the semiconductor switching element 3d is OFF, current flows through the semiconductor switching element 3a and the semiconductor switching element 3c while bypassing the DC capacitor 4. If the semiconductor switching element 3c is OFF and the semiconductor switching element 3d is ON, current flows through the semiconductor switching element 3a to charge the DC capacitor 4, and then is outputted through the semiconductor switching element 3d.

Figure 5:
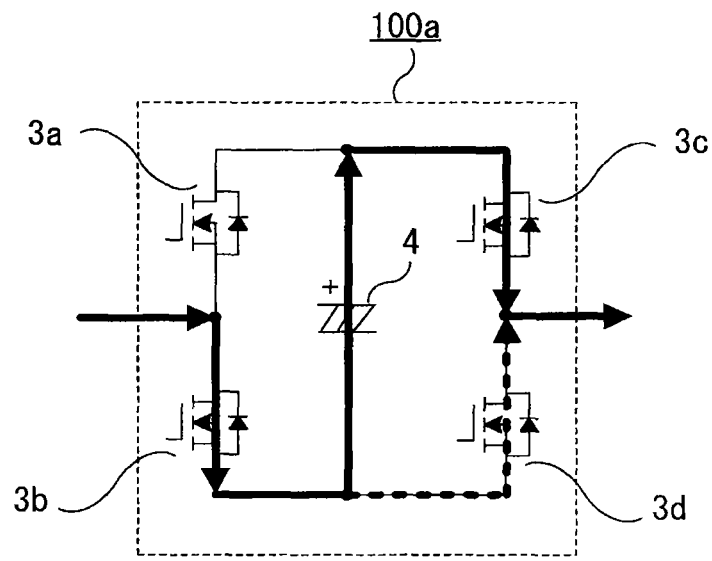
FIG. 5 is a diagram for explaining operation of the single-phase inverter according to embodiment 1 of the present invention.

When polarities of voltage and current for A-phase of the AC power supply 1 are positive, if the semiconductor switching element 3a is OFF and the semiconductor switching element 3b is ON, current flows in the single-phase inverter 100a through a current route shown in FIG. 5. If the semiconductor switching element 3c is ON and the semiconductor switching element 3d is OFF, current flows through the semiconductor switching element 3b to discharge the DC capacitor 4, and then is outputted through the semiconductor switching element 3c. If the semiconductor switching element 3c is OFF and the semiconductor switching element 3d is ON, current flows through the semiconductor switching element 3b and the semiconductor switching element 3d while bypassing the DC capacitor 4.

Figure 6:
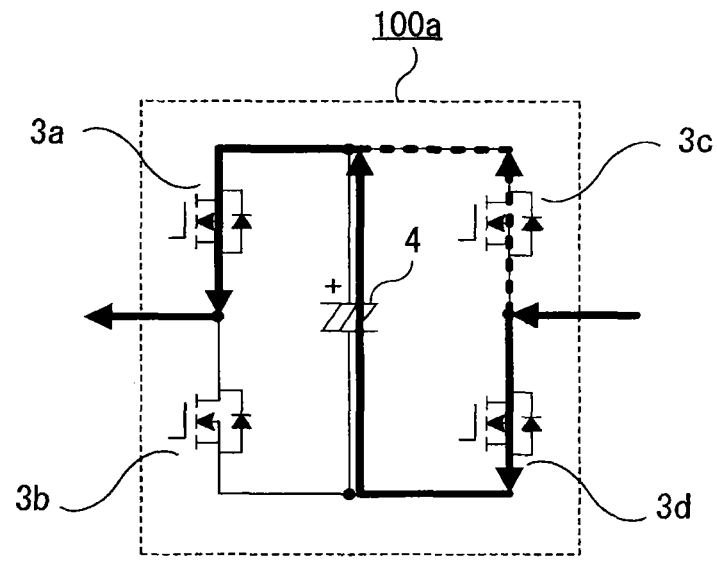
FIG. 6 is a diagram for explaining operation of the single-phase inverter according to embodiment 1 of the present invention.
Figure 7:
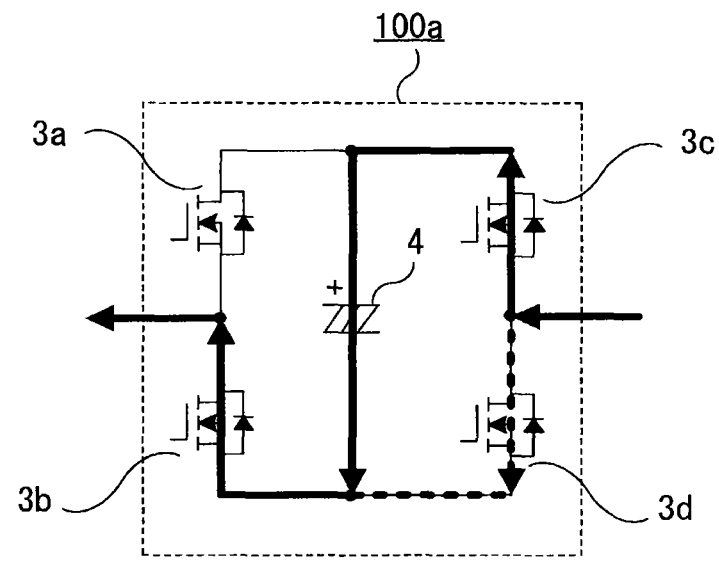
FIG. 7 is a diagram for explaining operation of the single-phase inverter according to embodiment 1 of the present invention.

When polarities of voltage and current for A-phase of the AC power supply 1 are negative, similarly, as shown in FIG. 6 and FIG. 7, charging, discharging, and bypassing of the DC capacitor 4 are controlled in accordance with a combination of switching controls of the semiconductor switching elements 3a to 3d.

Thus, in each of positive and negative polarities, four kinds of controls are combined to perform PWM control for the single-phase inverter 100a.

Next, operation of the three-phase converter 5 will be described.

As shown in FIG. 8, when polarities of voltage and current for A-phase of the AC power supply 1 are positive, the semiconductor switching element 5a is turned on, and current from the AC power supply 1 flows through the single-phase inverter 100a to the positive terminal of the smoothing capacitor 6 via the semiconductor switching element 5a. On the other hand, as shown in FIG. 9, when polarities of voltage and current for A-phase of the AC power supply 1 are negative, the semiconductor switching element 5b is turned on, current flowing from the negative terminal of the smoothing capacitor 6 via the semiconductor switching element 5b flows through the single-phase inverter 100a to the AC power supply 1.

Next, output voltage control of the single-phase inverter 100a will be described below in detail.

As described above, the current control section 18 in the control device 200 generates the basic command Vx* for each output voltage of the single-phase inverters 100a to 100c so that the AC current i follows the current command i*, that is, an input power factor for A-phase from the AC power supply 1 becomes approximately one. The basic command Vx* (see FIG. 3(g)) is a command for outputting difference voltage obtained by subtracting the voltage V1A-N of the AC end A from the AC power supply voltage Vin.

The single-phase inverter 100a, which operates to discharge the DC capacitor 4 when outputting positive voltage and to charge the DC capacitor 4 when outputting negative voltage, is controlled so that the charge amount and the discharge amount are balanced in one AC cycle. As a result, it is not necessary to supply power to the DC capacitor 4 from another external power supply.

Since operations in a positive half wave and a negative half wave in one cycle of the AC power supply 1 are symmetric, here, only the positive half wave will be described with reference to FIG. 10 and FIG. 11.

If the inputted AC current i is assumed to be controlled to be a sine wave with a power factor of 1, discharge power $P_{dch}$ and charge power $P_{ch}$ of the single-phase inverter 100a are represented by the following expressions (1) and (2). It is noted that θ and Vp are an AC phase and an AC voltage amplitude of the AC power supply voltage Vin (A-phase), Ip is an amplitude of the AC current i, and $θ_1$ is a phase at which the AC power supply voltage Vin and the voltage V1A-N coincide with each other. Although the single-phase inverter 100a is output-controlled based on the voltage command V* obtained by adding the zero-phase component Vo to the basic command Vx*, since the zero-phase component Vo has almost no influence on power, the discharge power $P_{dch}$ and the charge power $P_{ch}$ in the case where voltage is outputted based on the basic command Vx* are calculated.

[Mathematical 1]

$$P_{dch} = \int_{θ_1}^{π/3}\left(Vp\sinθ - \frac{1}{3}Vdc\right)\cdot Ip\sinθ\, dθ + \int_{2/3π}^{π-θ_1}\left(Vp\sinθ - \frac{1}{3}Vdc\right)\cdot Ip\sinθ\, dθ \quad (1)$$

[Mathematical 2]

$$P_{ch} = \int_{0}^{θ_1}\left(\frac{1}{3}Vdc - Vp\sinθ\right)\cdot Ip\sinθ\, dθ + \int_{1/3π}^{2/3π}\left(\frac{2}{3}Vdc - Vp\sinθ\right)\cdot Ip\sinθ\, dθ + \int_{π-θ_1}^{π}\left(\frac{1}{3}Vdc - Vp\sinθ\right)\cdot Ip\sinθ\, dθ \quad (2)$$

As described above, the single-phase inverter 100a is controlled so that the charge amount and the discharge amount are balanced in one AC cycle. Therefore, $P_{dch}=P_{ch}$ is satisfied, and a relationship between the AC voltage amplitude Vp and the smoothing capacitor voltage Vdc is represented by the following expression (3).

$$Vdc=(π/2)Vp \quad (3)$$

If the value of the smoothing capacitor voltage Vdc is thus set, the single-phase inverter 100a can be controlled so that charging and discharging are balanced and the DC capacitor voltage Vsub becomes constant.

Next, generation of the voltage command V* for the single-phase inverter 100a will be described below in detail.

FIG. 11(a) to FIG. 11(c) show the basic command V*, the zero-phase component Vo, and the voltage command V* for the single-phase inverter 100a.

In a positive half wave of the AC power supply 1, the basic command Vx* varies between a minimum value Vα(=(−⅓)Vdc) and a maximum value Vβ(=Vp·sin(π/3)−(⅓)Vdc), and the absolute value thereof becomes maximum at phases 0 and π as Vα. In the subsequent negative half wave, the basic command Vx* varies between −Vβ(=−Vp·sin(π/3)+(⅓)Vdc) and −Vα(=(⅓)Vdc), and the absolute value thereof becomes maximum at phases π and 2π as −Vα.

The basic commands Vx* for the other two phases (B-phase and C-phase) also have the same voltage waveform though there is a phase difference by 2π/3 from each other among the three phases.

As shown in FIG. 12, the zero-phase component Vo common to the three phases, generated by the Vo generating section 19, is added to the basic command Vx* for each phase outputted by the current control section 18, whereby the voltage command V* is generated. In order that the voltage command V* obtained by the addition maintains line-to-line voltage to keep a three-phase equilibrium state, the zero-phase component Vo is added, with the same frequency, the same phase, and the same amplitude, to each basic command Vx* for the single-phase inverters 100a to 100c.

The zero-phase component Vo is a voltage component that is to be commonly added to all the basic commands Vx* for the respective phases as described above to reduce each peak (absolute value). Therefore, the zero-phase component Vo has a voltage waveform which has a frequency 6N times (N: a positive integer) as high as the frequency of the AC power supply voltage Vin, and whose polarity is inverted at π/3 intervals.

The Vo generating section 19 stores reference zero-phase voltage Voo set in advance. The Vo generating section 19 calculates an amplitude a of the zero-phase component Vo based on the phase θ and the AC voltage amplitude Vp from the AC voltage detection circuit 15 and the smoothing capacitor voltage Vdc, and applies the amplitude a to the reference zero-phase voltage Voo, thereby generating the zero-phase component Vo(=a·Voo).

In this case, the reference zero-phase voltage Voo has a sine waveform whose frequency is six times as high as the frequency of the AC power supply voltage Vin, and is represented as follows.

cos 6θ (0≤θ<π/3, 2π/3≤θ<π, 4π/3≤θ<5π/3)

−cos 6θ (π/3≤θ<2π/3, π≤θ<4π/3, 5π/3≤θ<2π)

The zero-phase component Vo is represented as ±a·cos 6θ.

The amplitude a is calculated so as to reduce a peak (absolute value) of the voltage command V*. The voltage command V* obtained by adding the zero-phase component Vo to the basic command Vx* varies between Vα+a and Vβ+a. The amplitude a is calculated so that both absolute values of Vα+a and Vβ+a become smaller than −Vα, whereby the peak of the voltage command V* is reduced. As a result, minimum required voltage of the DC capacitor voltage Vsub of the single-phase inverter 100a can be reduced to be smaller than −Vα(=(⅓)Vdc).

In this case, the amplitude a is calculated as follows so that the absolute value of Vα+a which is the minimum voltage value of the voltage command V* is equal to the absolute value of Vβ+a which is the maximum voltage value of the voltage command V*.

That is, $-((-\frac{1}{3})Vdc+a) = Vp \cdot \sin(\pi/3) - (\frac{1}{3})Vdc+a$ is satisfied.

Therefore, $a = \frac{1}{2}((\frac{2}{3})Vdc - Vp \cdot \sin(\pi/3))$ is obtained.

When the absolute values of the minimum voltage value and the maximum voltage value of the voltage command V* are equal to each other, the peak of the voltage command V* can be most reduced, and the DC capacitor voltage Vsub of the single-phase inverter 100a can be effectively reduced.

It is noted that, if the amplitude a is set in a range (hereinafter, referred to as an amplitude range) of $0 < a < ((\frac{2}{3})Vdc - Vp \cdot \sin(\pi/3))$, the peak of the voltage command V* can be reduced and the DC voltage of the single-phase inverter 100a can be reduced.

In addition, the amplitude a is calculated within the amplitude range so that the peak (absolute value of Vα+a or Vβ+a) of the voltage command V* becomes equal to or smaller than the voltage value of the DC capacitor voltage Vsub that has been set. As a result, DC voltage of the single-phase inverter 100a can be reliably reduced.

Although the A-phase of the AC power supply 1 and the single-phase inverter 100a of the inverter circuit 100 have been described above, the same applies to the other two phases, i.e., the single-phase inverters 100b and 100c.

As described above, in the present embodiment, the control device 200 calculates the amplitude a of the zero-phase component Vo based on the AC phase θ, the AC voltage amplitude Vp, and the smoothing capacitor voltage Vdc, and generates the zero-phase component Vo obtained by applying the amplitude a to the reference zero-phase voltage Voo set in advance. Then, the zero-phase component Vo common to the three phases is added to the basic command Vx* for each of the single-phase inverters 100a to 100c, whereby the voltage command V* is generated. The control device 200 determines the amplitude a within the amplitude range, whereby the peak of the voltage command V* can be reduced and DC voltages of the single-phase inverters 100a to 100c can be reduced. In addition, since the amplitude a can be calculated based on information (θ, Vp, Vdc) used in ordinary control for such three-phase power conversion devices, the zero-phase component Vo can be easily generated and the voltage level thereof can be changed.

Thus, while line-to-line voltages in three-phase AC output is kept in a three-phase equilibrium state, the degree of freedom in designing can be improved and DC voltages of the single-phase inverters 100a to 100c can be reduced. Therefore, reduction in withstand voltage of each element in the single-phase inverters 100a to 100c can be effectively promoted. Generally, along with reduction in element withstand voltage, conduction loss reduces, whereby efficiency can be enhanced, and in addition, voltage for ON/OFF of a semiconductor switching element can be reduced, whereby the enhancement in efficiency can be further promoted. At the same time, owing to the reduction in voltage for ON/OFF of a semiconductor switching element, noise can be reduced. Thus, a three-phase power conversion device with a small size and high efficiency can be reliably obtained.

In the above embodiment, the reference zero-phase voltage Voo is $\pm \cos 6\theta$, but may be set using the following expression. In this case, n is an integer equal to or greater than 0, and the reference zero-phase voltage Voo has a voltage waveform which has a frequency 6N times (N: a positive integer) as high as the frequency of the AC power supply voltage Vin, and whose polarity is inverted at π/3 intervals.

$\cos 6n\theta$ $(0 \le \theta < \pi/3, 2\pi/3 \le \theta < \pi, 4\pi/3 \le \theta < 5\pi/3)$ $-\cos 6n\theta$ $(\pi/3 \le \theta < 2\pi/3, \pi \le \theta < 4\pi/3, 5\pi/3 \le \theta < 2\pi)$ It is noted that, when n is 0, the reference zero-phase voltage Voo is ±1, and in this case, the zero-phase component Vo has a waveform in which the value thereof alternately varies between constant values a and −a corresponding to an amplitude, at π/3 intervals.

Although the AC voltage amplitude Vp has been shown as information about voltage detected by the AC voltage detection circuit 15, other voltage values such as an effective value may be used.

If the amplitude a of the zero-phase component Vo is determined within the amplitude range on the basis of the withstand voltages of the semiconductor switching elements 3a to 3d used in the single-phase inverters 100a to 100c or the withstand voltage of the smoothing capacitor 6, reduction in withstand voltage of each element can be effectively promoted.

The three-phase power converter is not limited to the three-phase converter 5 according to the above embodiment, but may be a three-phase converter using a diode element or may be a three-phase 3-level converter.

In the above embodiment, the case where the three-phase power conversion device converts three-phase AC power from the AC power supply 1 to DC power has been shown. However, a three-phase power conversion device that converts DC power from the smoothing capacitor 6 to AC power and outputs the AC power to the AC power supply 1 may be used.

The inverter circuit 100 composed of the single-phase inverters 100a to 100c is also applicable to three-phase power conversion devices having other circuit configurations. In this case, although the way of generation of the basic command Vx* is different, the zero-phase component Vo common to the three phases can be generated in the same manner by calculating the amplitude a using the AC phase θ and the AC voltage amplitude Vp for each phase and applying the amplitude a to the reference zero-phase voltage Voo set in advance, and the voltage command V* obtained by adding the zero-phase component Vo to the basic command Vx* provides the same effect as in the above embodiment 1.

It is noted that, within the scope of the present invention, each of the above embodiments may be modified or abbreviated as appropriate.

The invention claimed is:

1. A three-phase power conversion device comprising:
single-phase inverters each including a DC capacitor and a plurality of semiconductor switching elements, the single-phase inverters having AC output ends connected in series to respective phases of three-phase AC lines; and
a control device for performing PWM control for each single-phase inverter based on a voltage command,
the three-phase power conversion device further comprising an AC voltage detection circuit for detecting a phase and voltage of three-phase AC voltage from the three-phase AC lines, wherein
the control device includes a voltage command generating section for, based on the phase and the voltage from the AC voltage detection circuit, adding a zero-phase component common to the three phases to a basic command for each phase to generate the voltage command, and the voltage command generating section determines an amplitude of the zero-phase component so that a magnitude of a peak of the voltage command becomes smaller than a maximum absolute value of the basic command for each phase, and applies the amplitude to reference zero-phase voltage set in advance, to determine the zero-phase component synchronized with the phase of the three-phase AC voltage.

2. The three-phase power conversion device according to claim 1, wherein the voltage command generating section determines the amplitude so that the magnitude of the peak of the voltage command becomes equal to or smaller than voltage of the DC capacitor of each single-phase inverter.

3. The three-phase power conversion device according to claim 1, further comprising:

a three-phase power converter including a plurality of semiconductor elements to convert power between AC and DC, the three-phase power converter having AC ends for the respective phases connected to the respective single-phase inverters via the three-phase AC lines; and a capacitor connected to a DC side of the three-phase power converter, wherein the three-phase AC lines are connected to a three-phase AC power supply, the single-phase inverters are respectively connected in series to the three-phase AC lines, between the three-phase power converter and the AC power supply, and output voltages of the single-phase inverters are respectively superimposed onto the output AC voltages for the respective phases of the three-phase power converter, and resultant voltages are outputted to the AC power supply.

4. The three-phase power conversion device according to claim 3, further comprising:

a detector for detecting voltage of the capacitor, wherein the AC voltage detection circuit detects voltage of the AC power supply as the three-phase AC voltage, and the voltage command generating section determines an amplitude of the zero-phase component, based on voltage of the capacitor and on the phase and the voltage from the AC voltage detection circuit.

5. The three-phase power conversion device according to claim 4, wherein the voltage command generating section generates the basic commands for the respective phases so as to output differences between voltages for the respective phases of the AC power supply and the output AC voltages for the respective phases of the three-phase power converter, and determines the amplitude of the zero-phase component so that absolute values of a maximum voltage value and a minimum voltage value of the voltage command are equal to each other.

6. The three-phase power conversion device according to claim 4, wherein the amplitude of the zero-phase component is determined so as to satisfy the following:

$$0 < a < ((2/3)Vdc - Vp \cdot \sin(\pi/3)),$$

where a is the amplitude of the zero-phase component, Vdc is the voltage of the capacitor, and Vp is an amplitude of the voltage of the AC power supply.

7. The three-phase power conversion device according to claim 3, wherein the zero-phase component has a voltage waveform which has a frequency 6N times as high as a frequency of the three-phase AC voltage and whose polarity is inverted every (1/6) cycle of the three-phase AC voltage.

8. The three-phase power conversion device according to claim 7, wherein the voltage waveform of the zero-phase component indicates a constant value whose polarity is inverted every (1/6) cycle or a sine waveform whose polarity is inverted every (1/6) cycle.

9. The three-phase power conversion device according to claim 3, wherein the voltage command generating section determines the amplitude of the zero-phase component, based on element withstand voltages of the semiconductor switching elements in each single-phase inverter and element withstand voltage of the capacitor.

* * * * *